(12) United States Patent
Kaczkowski et al.

(10) Patent No.: US 7,921,680 B2
(45) Date of Patent: Apr. 12, 2011

(54) APPARATUS AND PROCESS FOR TREATING AN ARTICLE TO IMPART COLOR AND/OR ENHANCE THE PROPERTIES OF THAT ARTICLE

(75) Inventors: Edward F. Kaczkowski, Pittsburgh, PA (US); Robert A. Pyles, Bethel Park, PA (US); Daniel E. Jaskiewicz, Dawson, PA (US); Rick L. Archey, Pleasant Hills, PA (US); George See, Venetia, PA (US); Ronald J. Rathi, Pittsburgh, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 568 days.

(21) Appl. No.: 11/803,917

(22) Filed: May 16, 2007

(65) Prior Publication Data

US 2008/0286478 A1  Nov. 20, 2008

(51) Int. Cl.
*D06F 1/02* (2006.01)
(52) U.S. Cl. .............................. 68/5 D; 68/5 E; 68/205 R
(58) Field of Classification Search ...................... 68/5 E, 68/5 D
See application file for complete search history.

(56) References Cited

U.S. PATENT DOCUMENTS

| | | | | |
|---|---|---|---|---|
| 2,034,987 A | * | 3/1936 | Morita | 427/380 |
| 2,067,012 A | * | 1/1937 | Loetscher | 428/498 |
| 2,725,643 A | * | 12/1955 | Ransohoff | 34/242 |
| 2,732,701 A | * | 1/1956 | Smith et al. | 68/20 |
| 2,902,138 A | * | 9/1959 | Oelkers | 198/340 |
| 2,915,230 A | * | 12/1959 | Brewin et al. | 223/76 |
| 2,979,066 A | * | 4/1961 | Christie | 137/3 |
| 3,181,750 A | * | 5/1965 | Helliwell et al. | 223/76 |
| 3,271,102 A | * | 9/1966 | Morgan | 8/151 |
| 3,507,423 A | * | 4/1970 | Swindall | 223/76 |
| 3,644,085 A | * | 2/1972 | Beeley et al. | 8/150 |
| 3,712,086 A | * | 1/1973 | Payet et al. | 68/5 C |
| 3,732,628 A | * | 5/1973 | Blevens et al. | 34/389 |
| 3,770,148 A | * | 11/1973 | Hendren | 414/287 |

(Continued)

FOREIGN PATENT DOCUMENTS

DE  1 904 215  * 1/1969

(Continued)

*Primary Examiner* — Frankie L Stinson
(74) *Attorney, Agent, or Firm* — John E. Mrozinski, Jr.; Lyndanne M. Whalen; Noland J. Cheung

(57) ABSTRACT

A process and an apparatus for treating large articles to impart color or performance enhancing additives to the article in which a treatment system which includes: (i) a coloring solution and/or a solution containing at least one performance enhancing additive, (ii) water, and (iii) a solvent such as ethylene glycol monobutyl ether and diethylene glycol is applied to the article. The apparatus is made up of (a) a spray enclosure sized to contain the article(s) to be treated; (b) dispensing means, such as nozzles, which are configured to dispense sequentially, hot solution (i), hot solution (ii) and hot water (iii) directly onto the article surface(s); (c) means for securing and transporting the article to be treated into and out of the spray enclosure (such as a trolley system); and at least three closed vessels capable of delivering enough hot saturated coloring and/or performance enhancing solution, hot dye-free rinse solution and deionized water, respectively, with sufficient pressure to form small droplets from the spray nozzles, to thoroughly cover and rinse articles contained in the enclosure.

13 Claims, 1 Drawing Sheet

U.S. PATENT DOCUMENTS

| | | | | |
|---|---|---|---|---|
| 3,927,539 | A | * 12/1975 | Harkison | 68/3 R |
| 3,983,723 | A | * 10/1976 | Ameling | 68/5 E |
| 4,047,889 | A | * 9/1977 | Hermes | 8/440 |
| 4,070,876 | A | * 1/1978 | Thompson et al. | 68/3 R |
| 4,115,054 | A | * 9/1978 | Hermes | 8/492 |
| 4,388,289 | A | * 6/1983 | Shepherd et al. | 423/447.4 |
| 4,550,579 | A | * 11/1985 | Clifford | 68/5 C |
| 5,376,144 | A | * 12/1994 | McClain et al. | 8/116.4 |
| 6,068,666 | A | * 5/2000 | Amick et al. | 8/441 |
| 6,994,735 | B2 | 2/2006 | Pyles et al. | 8/609 |
| 2003/0066138 | A1 * | 4/2003 | France et al. | 8/147 |
| 2003/0211288 | A1 * | 11/2003 | Schottland | 428/156 |

FOREIGN PATENT DOCUMENTS

| | | |
|---|---|---|
| DE | 37 18 580 | * 12/1988 |
| FR | 2 847 595 | * 5/2004 |
| JP | 01-277814 | * 11/1989 |
| JP | 2004-204367 | * 7/2004 |

* cited by examiner

APPARATUS AND PROCESS FOR TREATING AN ARTICLE TO IMPART COLOR AND/OR ENHANCE THE PROPERTIES OF THAT ARTICLE

FIELD OF THE INVENTION

The present invention relates to a process and to an apparatus for treating, preferably by spraying, an article which is preferably a polymeric material, to impart color and/or to enhance the properties of that article.

BACKGROUND INFORMATION

In the course of dyeing materials, particularly plastics, it is sometimes desirable to color very large and heavy articles such as coated glass sheets, plastic sheets, furniture, large volume water bottles and automobile windows. Some of these articles may be large, e.g., up to 5 feet wide by 10 feet long, and weigh in excess of 300 pounds. In these instances, it is more economical and environmentally attractive to color large articles using spray processes because spray processes significantly reduce the required volume of coloring solution and eliminate the need for large volume dipping tanks. Hence vessels containing the dye solutions, as well as ancillary equipment such as pumps and heaters, can be smaller, and consequently, less expensive. Also, the smaller quantities of dye-containing solution discarded as the result of a color change can be reclaimed more efficiently.

In addition to using less solution, spray processes also allow large articles to be easily transported via a simple conveyer into an enclosed spray apparatus where both coloring and subsequent rinsing take place. Once coloring and rinsing are completed, the articles are simply conveyed out of the spray apparatus for drying and packaging. In contrast, if similarly sized articles are immersed in coloring solutions, expensive cranes, requiring buildings with high bay areas, must be used to convey and lift heavy articles into and out of huge vats of hot solution. Moreover, these vats open to the atmosphere and create a potential for introducing vapors into the environment. Also, there is a problem with solution cross-contamination as the articles are lifted from one vat to another, dripping solution as they move. Another objection to the immersion technique is that due to their size, the articles cannot be moved in and out of the vats quickly enough to avoid non-uniformity in the color.

U.S. Pat. No. 6,994,735 describes a method of spraying dye solutions onto plastic articles to add color to the article. However, no apparatus for performing such operations is described.

It would be desirable to have an efficient apparatus for spraying dye-containing solutions and associated rinse solutions onto relatively large substrates.

SUMMARY OF THE INVENTION

Accordingly, the present invention provides a process and an apparatus for treating large articles, preferably by spraying, with (1) a coloring system containing dye and/or a solution containing performance enhancing materials, (2) water, and (3) solvent(s) such as ethylene glycol monobutyl ether and diethylene glycol. The apparatus of the present invention includes an enclosure or vessel sized to contain an article to be treated with means for dispensing (e.g., by spraying through nozzles) the coloring and/or performance enhancing solution sequentially onto the article to be colored, means for securing the article to be treated and means for transporting the article to be treated into and out of the enclosure. The treatment system is applied to the article to be treated in the following sequence: first, hot dye-containing solution and/or hot solution containing performance enhancing material(s); second, hot dye-free solution; and third, hot water directly onto the article surface(s). The preferred means for securing and transporting the article to be treated is a trolley system designed to securely hold and transport large and heavy articles into the spray vessel for subsequent treatment with color and/or performance enhancing solution and rinse solutions. The means for dispensing the coloring system are connected to three or more closed vessels. Each of the closed vessels must be capable of delivering enough of a hot treatment system component with sufficient pressure that small droplets will be released from the dispensing means in an amount sufficient to either color, enhance or rinse the substrate being colored. The apparatus of the present invention must include at least one closed vessel for a saturated dye-containing solution or a solution containing a performance enhancing additive, at least one closed vessel for a hot dye-free rinse solution and at least one closed vessel for hot deionized water. Optional vessel(s) for collection of discarded solutions for reclamation may also be included in the apparatus of the present invention.

Each means for dispensing a component of the treatment system (also referred to herein as a "nozzle") is designed to disperse solution at a temperature sufficient to color or treat the article to be treated. The nozzles are configured inside the enclosure or vessel in which the treatment system is to be dispensed so that the entire surface of the article to be colored or covered with solution containing performance enhancing additive will receive dispensed treatment system components. The enclosure includes an outlet through which dye-containing and/or performance enhancing solution may be removed from the enclosure and recycled back to the supply vessel where the solution is reheated and re-saturated with dye or performance enhancing additive before being returned to the spray enclosure containing the article to be treated. Recycling is continued until the article is the desired color or the desired amount of performance enhancement has been attained. The treated article is then rinsed, first, with dye-free solvent followed by a water rinse. When a color or additive change is required, the discarded dye-containing or performance enhancing additive-containing solution may be transferred to a vessel for discarded solutions for reclamation. The dye-free solvent rinse solution falls to the spray enclosure outlet from which it is then transported to a discarded solution vessel for reclamation. Waste rinse water is also removed from the spray enclosure at the enclosure outlet, treated to remove low levels of residual organic compounds and discarded into a waste water treatment facility.

These and other aspects of the present invention will become more readily apparent from the following drawing, detailed description and appended claims.

DESCRIPTION OF PREFERRED EMBODIMENTS

Figure 1:
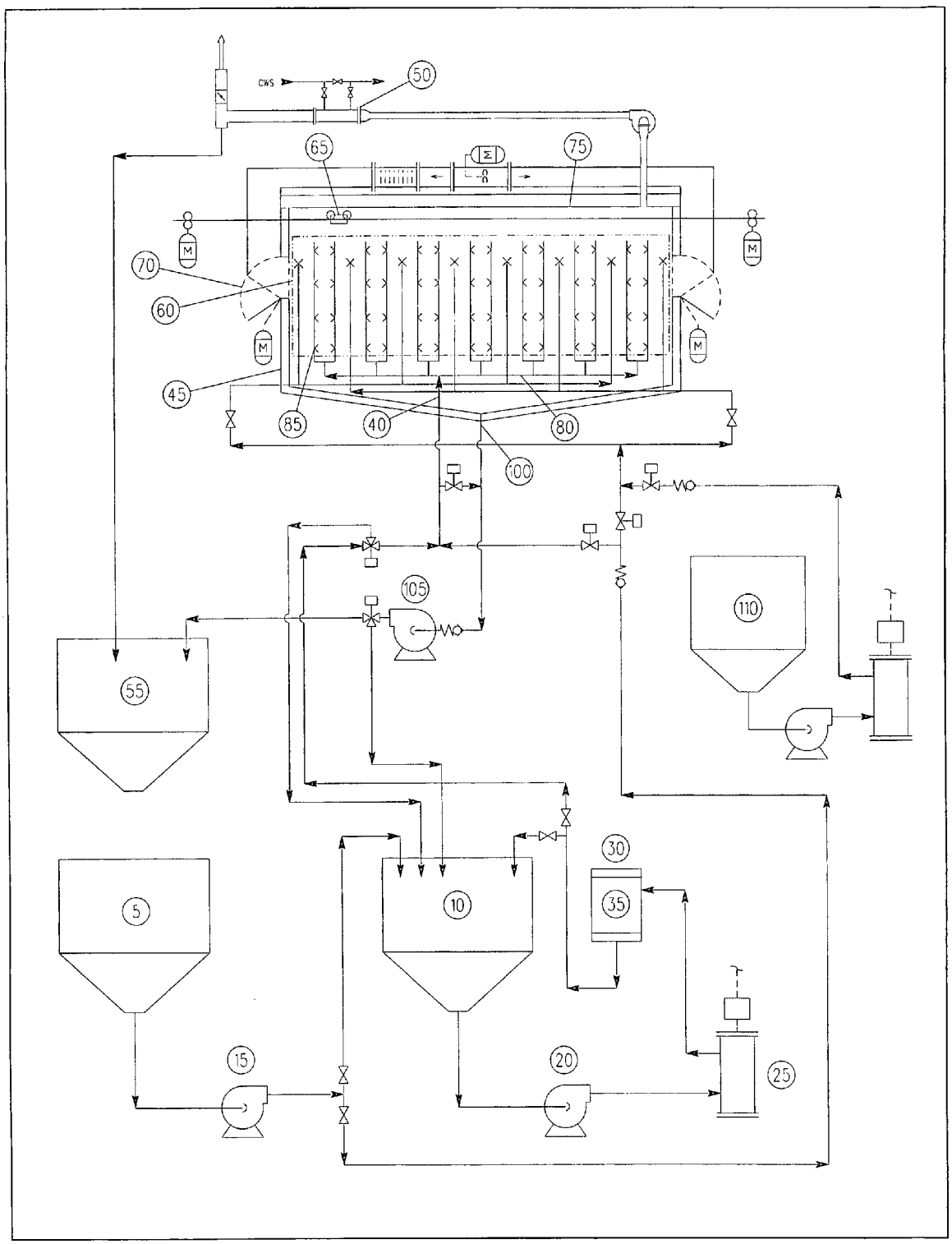
FIG. 1 illustrates an apparatus within the scope of the present invention.

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

The present invention provides a process and an apparatus for preparing and applying, preferably by spraying, a coloring or performance enhancing system which includes at least one coloring agent or dye-containing solution and/or a performance enhancing additive or solution containing at least one performance enhancing additive and associated rinse solutions onto a material to be treated which is preferably a polymeric material such as a polycarbonate, a polyurethane, a polyester (preferably a glycolized polyester), a polymethylmethacrylate (acrylic), a nylon, a thermoplastic polyurethane, a polyvinylchloride, a polycarbonate/acrylonitrile butadiene styrene (ABS) blend, a polycarbonate/polyester blend or an ABS.

The coloring agent(s) or dye(s) suitable for use in the process and apparatus of the present invention include, for example, conventional dyes such as fabric dyes and disperse dyes as well as dyes that are known in the art to be suitable for tinting polymeric materials such as polycarbonates. Specific examples of suitable disperse dyes include Disperse Blue #3, Disperse Blue #14, Disperse Yellow #3, Disperse Red #13 and Disperse Red #17. Dyestuffs are generally used either as a sole dye constituent or as a component of a dye mixture depending upon the color desired. Thus, the term "dye" as used herein includes "dye mixture". Solvent dyes may also used in dying operations conducted in accordance with the process of the present invention in the apparatus of the present invention. Some examples of suitable solvent dyes include Solvent Blue 35, Solvent Green 3 and Acridine Orange Base. Water-insoluble azo, diphenylamine and anthraquinone compounds; acetate dyes, dispersed acetate dyes, dispersion dyes and dispersol dyes, specific examples of which include Dystar's Palanil Blue E-R150 (anthraquinone/Disperse Blue) and DIANIX Orange E-3RN (azo dye/CI Disperse Orange 25) may also be used in the practice of the present invention. Acid dyes, such as those used for dying nylon, as well as reactive dyes sold under the trade name Reactint for use with polyurethanes and polyurethane blends, are also suitable for use in the practice of the present invention.

The apparatus of the present invention is also suitable for spraying solutions containing additives which enhance the performance characteristics of the article to be treated. Suitable performance enhancing additives include: photochromic dyes, UV-stabilizers, antistatic agents, flame retardants, mold release agents, antimicrobials, and other performance improving additives.

The apparatus of the present invention is also suitable for applying, preferably by spraying, solutions containing both a coloring agent and an additive to enhance the performance of the material to be colored which is preferably a plastic. The apparatus of the present invention is also suitable for applying separately one or more solutions containing a coloring agent and one or more other solutions containing performance enhancing additives.

The apparatus of the present invention is also suitable for applying, preferably by spraying, any associated rinsing liquids required to produce a clean, market ready article.

The enclosure in which the article to be treated is positioned may be made of any material which will withstand the operating conditions and exposure to the solutions being applied to the article being treated. It is preferred that the walls of the enclosure be made of a transparent material such as tempered glass, so that the progress of the treatment, particularly treatment to impart color to the article may be observed. However, progress of the treatment may also be monitored by video camera or visually through small ports in the door(s) or side(s) of the enclosure.

All of the vessels, nozzles, and interconnecting piping are fabricated of materials which do not absorb dyes or additives from the solution. Examples of suitable materials include: stainless steel, aluminum, glass and plastics such as crystalline polyesters or polyolefins. As used herein, the term "materials which do not absorb dyes or additives from solution" will be used to denote any of these materials. Preferably, the components of the apparatus are made of stainless steel.

Referring now to FIG. 1, which illustrates an embodiment of the present invention in which the article to be treated is being treated to impart color to that article. The dye-free solution is typically formulated with water and organic solvents such as ethylene glycol butyl ether, diethylene glycol ethylether, diethylene glycol butylether, propylene glycol propylether, dipropylene glycol propylether and tripropylene glycol propylether and diethylene glycol. U.S. Pat. Nos. 6,733,543; 6,749,646; 6,929,666; 6,949,127; 6,994,735; and 7,094,263 disclose particularly advantageous formulations for producing such dye-free solutions and each of these disclosures is incorporated herein by reference. The dye-free solution components are mixed and heated in a closed insulated vessel 5 to a maximum temperature of 95° C. This solution is used directly as the dye-free rinse solution, and as a solvent feedstock useful for formulating dye-containing solutions in closed vessel 10, as described below.

To formulate the dye-containing solution, the dye-free solution contained in vessel 5 is transferred by pump 15 to vessel 10, fitted with a second pump 20, heater 25 and bag filter 30 in a piping arrangement that continuously circulates the solution in vessel 10 from the bottom of vessel 10 through the heater 25 and bag filter 30, respectively, and returns the solution back to vessel 10. The filter bag 35 contains dye that, over the course of a few minutes, saturates the circulating dye-free solution and produces the hot, dye-containing solution required for practicing the present invention. Each of U.S. Pat. Nos. 6,733,543; 6,749,646; 6,929,666; 6,949,127; 6,994,735; and 7,094,263 describes in detail processes for producing such dye-containing and performance-enhancing additive solutions, and is incorporated herein by reference. The dye-containing solution is transferred using pump 20 from vessel 10 through spray enclosure inlet 40.

The spray enclosure 45 is vented to a condenser system 50 sized to condense solvent vapors and return the resulting liquid to a reclamation vessel 55, while allowing air to be channeled through a roof vent. Optionally, the spray enclosure 45 is double insulated and has supplemental pad heaters attached to its walls as an aid to maintaining the temperature of the dye-containing solution during the spraying operation. Additionally, an optional heater and fan may be attached to the spray enclosure 45 to concurrently heat the air and article to be colored 60 inside the enclosure 45 to a predetermined temperature before the dye-containing solution is applied to the article 60.

Article(s) 60 is mounted on a fixture attached to a trolley 65. The trolley 65, with the article(s) 60 attached, is moved into the spray enclosure 45 through door 70. A continuous rubber seal 75 permits ingress and egress of the trolley while keeping the enclosure 45 sealed. The door 70 is secured and hot dye-containing solution is transferred from vessel 10 by pump 20 to spray enclosure 45 via the inlet manifold 40 and header system 80. The pump 20, used to transfer the dye-containing solution from the solution vessel 10 to the spray enclosure 45, controls the solution flow rate through the piping, and consequently, the pressure of the solution as it enters the header 80 and exits the nozzles 85. The article 60 is positioned in front of the nozzles 85 so that the entirety of one or both of the surfaces of the article 60 is/are covered with coloring solution exiting from the nozzles 85.

The temperature of the solution entering the nozzle(s) 85 is 30-100° C. at a pressure of 5-50 psi. The solution temperature is dependent on the material being colored, particularly plastic materials being colored. For example, rigid, high heat distortion materials such as polycarbonate are colored above 90° C. while more flexible, rubbery materials color at around 45-60° C. The preferred nozzle 85 pressure is 15-25 psi.

In the next steps of the process, solution exits the spray vessel 45 through outlet 100. The exiting solution is continuously recycled via pump 105 back to the dye-containing solution vessel 10 to be reheated and saturated again with dye. The solution is continuously cycled until the article 60 attains the desired color.

After the article 60 has attained the desired color, the dye-containing solution flow is stopped and hot, dye-free solution rinse is pumped from heated vessel 5 through nozzles 85, applying dye-free solvent rinse to the article 60 surface(s) to remove any excess dye. The dye-free solution is typically heated to increase cleaning efficiency and to thoroughly remove all article surface dye. The solution temperature is dependent on the material being colored, as described above in the dyeing sequence. Moreover, the temperature of the dye-free rinse solution can be independent of the dye-containing solution. Unlike the dye-containing solution which is circulated continuously back to the source (vessel 10) during the coloring operation, the dye-free solution is not circulated back to the source vessel but rather, after one pass through the spray enclosure 45, is pumped via pump 105 directly to reclamation vessel 55 to be reclaimed. After thorough rinsing of the article, as indicated by the complete removal of dye, the dye-free solution flow is stopped and distilled or deionized water is pumped from a heated vessel 110 through the nozzles 85 onto the article 60 surface(s) to remove traces of residual dye-free solution, leaving the article 60 free of organic solvents but wet with water. Residual water can be wiped away with a soft cloth or blown from the article 60 with compressed air. Another means, albeit slower than wiping or blowing compressed air, is the use of infrared heaters to evaporate the residual water from the article 60 surface(s).

Nozzles 85 are designed and spaced within spray enclosure 45 to provide maximum solution coverage to the surface(s) of article 60. The maximum coverage for article 60 when it is in the form of a flat sheet is obtained using a type full-cone nozzle 85. The nozzle 85, located 5-8 inches (optimally 6⅞ inches) from the sheet surface, will, at the optimum distance, spray a circular pattern of solution covering an area approximately 21 to 26 inches (optimally 23⅝ inches) in diameter. Consequently, nine of these nozzles 85, spaced 15 to 20 inches apart (optimally 17¼ inches) on center, will totally cover a 4 feet wide by 4 feet long piece of sheet on one side with sprayed solution. For two sided coloration, a similar configuration of nozzles 85 must be positioned in the spray vessel on the reverse side of the sheet, doubling the total number of required nozzles 85 to eighteen. Assuming the spray enclosure 45 has sufficient width, several nozzle headers, including headers equipped with nozzles on a common header but facing in opposite directions, can optionally be installed to cover multiple sheet pieces with solution in a single operation.

There are generally significant areas of overlap between the spray nozzles 85 where two nozzles 85 will double the amount of colored solution sprayed on the sheet surface per unit time. Moreover, as the hot color solution droplets impacts the flat sheet surface of article 60, small rivulets are formed as the droplets coalesce and are pulled by gravity, to the bottom of the flat sheet. It might be expected that these areas will ultimately appear as defects (dark streaks) however, it has been found that the spray process of the present produces sheet articles that are very uniform in color.

Any of the known dye-containing and dye-free solutions may be used in the process of the present invention.

In a preferred embodiment of the present invention, the system contains an in-line probe or detector to determine the clean solvent composition. The probe can be a near IR analyzer or other instrument for determining purity. Other analytical techniques for determining the clean solvent composition, such as gas chromatography, can be used, but near IR (NIR) is the most reliable and cost effective means to do this analysis.

Although it is possible for the process of the present invention to be conducted manually, it is preferred that the coloring process of the present invention be controlled electronically, most preferably, by a human-machine interface (HMI) programmed to sequence valve functions.

Whereas particular embodiments of this invention have been described above for purposes of illustration, it will be evident to those skilled in the art that numerous variations of the details of the present invention may be made without departing from the invention as defined in the appended claims.

What is claimed is:

1. An apparatus for treating an article to impart color to that article and/or to enhance the physical properties of that article comprising:
    a) a heated enclosure or vessel sufficiently large to enclose the article to be treated,
    b) means for applying components of a treatment system comprising
        (i) a coloring solution and/or a solution comprising a performance enhancing additive,
        (ii) an organic solvent, and
        (iii) water
        directly onto the article's surface in sequence in a manner such that the article's surface to be treated is completely covered,
    c) means for securely holding the article to be treated,
    d) means for transporting the article to be treated into the heated enclosure and removing the article from the enclosure after treatment,
    e) a closed, heated vessel capable of delivering enough hot saturated coloring solution and/or performance enhancing solution with sufficient pressure to form small droplets when applied onto the article's surface,
    f) a closed, heated vessel capable of delivering enough hot dye-free rinse solution with sufficient pressure to form small droplets when applied onto the article's surface, and
    g) a closed, heated vessel capable of delivering enough hot deionized water with sufficient pressure to form small droplets when applied onto the article's surface,
    wherein the article is made from a plastic selected from the group consisting of polycarbonate, polyurethane, polyester, (polymethylmethacrylate (acrylic), nylon, thermoplastic polyurethane, polyvinylchloride, polycarbonate/acrylonitrile butadiene styrene (ABS) blend, a polycarbonate/polyester blend or an ABS.

2. The apparatus of claim 1 in which the components are controlled with a programmable human-machine interface (HMI).

3. The apparatus of claim 1 in which heated enclosure a) is fitted with a vent condenser to condense vapors and return any resulting liquid to a reclamation vessel.

4. The apparatus of claim 1 in which heated enclosure a) is insulated and has sides equipped with heaters.

5. The apparatus of claim 1 in which heated enclosure a) is equipped with a heater and blower combination to heat the article and air inside the enclosure.

6. The apparatus of claim 1 in which application means b) sprays a pattern on the article.

7. The apparatus of claim 1 in which application means b) are positioned 5-8 inches from the article surface.

8. The apparatus of claim 1 in which application means b) dispense a spray pattern which is from 21 to 27 inches in diameter.

9. The apparatus of claim 1 in which application means b) are spaced 15-20 inches apart on center.

10. The apparatus of claim 1 in which application means b) are attached to flexible hoses.

11. The apparatus of claim 1 further comprising a vessel for collection of any discarded solution for reclamation.

12. The apparatus of claim 1 in which the enclosure, spraying means and closed heated vessels are fabricated of a material which does not absorb dye.

13. The apparatus of claim 1 in which the spray enclosure includes a continuous rubber seal positioned to enable a trolley to transport the article to be treated into the spray enclosure.

\* \* \* \* \*